United States Patent [19]

Massie

[11] Patent Number: 5,179,774
[45] Date of Patent: Jan. 19, 1993

[54] APPARATUS AND METHOD FOR MECHANICALLY APPLYING A SEALING STRIP

[75] Inventor: Stephen P. Massie, South Woodham Ferrers, England

[73] Assignee: Ford Motor Company, Dearborn, Mich.

[21] Appl. No.: 867,957

[22] Filed: Apr. 13, 1992

Related U.S. Application Data

[62] Division of Ser. No. 705,237, May 24, 1991, Pat. No. 5,121,532.

[30] Foreign Application Priority Data

May 24, 1990 [GB] United Kingdom ............. 9011608

[51] Int. Cl.$^5$ ............................................. B23P 11/02
[52] U.S. Cl. ........................................ 29/451; 29/450; 29/235
[58] Field of Search ............... 29/450, 451, 433, 559, 29/235, 701, 709, 714, 715, 717; 49/490, 498

[56] References Cited

U.S. PATENT DOCUMENTS

| | | | |
|---|---|---|---|
| 4,308,653 | 1/1982 | Hinton et al. ........................ 29/235 |
| 4,620,354 | 11/1986 | Hess et al. .......................... 29/417 |
| 4,635,335 | 1/1987 | Brown et al. ........................ 29/235 |
| 4,653,166 | 3/1987 | Bright ................................. 29/235 |
| 4,715,110 | 12/1987 | St. Angelo et al. . |
| 4,760,636 | 8/1988 | St. Angelo et al. . |
| 4,780,943 | 11/1988 | St. Angelo et al. . |
| 4,839,958 | 6/1989 | St. Angelo, Jr. et al. ............. 29/450 |
| 4,843,701 | 7/1989 | St. Angelo, Jr. et al. ............. 29/235 |
| 4,852,240 | 8/1989 | St. Angelo, Jr. et al. ............. 29/559 |
| 4,897,913 | 2/1990 | St. Angelo, Jr. et al. ............. 29/450 |
| 5,018,264 | 5/1991 | Kautt ............................... 29/235 X |
| 5,029,381 | 7/1991 | St. Angelo, Jr. et al. ............. 29/701 |
| 5,031,293 | 7/1991 | Goedderz et al. .................... 29/235 |
| 5,048,170 | 9/1991 | Küppers ............................. 29/235 |
| 5,067,225 | 11/1991 | St. Angelo, Jr. et al. ............. 29/451 |
| 5,068,952 | 12/1991 | Hennen .............................. 29/235 |
| 5,103,546 | 4/1992 | Rossini et al. ....................... 29/450 |
| 5,115,551 | 5/1992 | Goedderz et al. .................... 29/450 |

FOREIGN PATENT DOCUMENTS 2152569  9/1987  United Kingdom .

Primary Examiner—Timothy V. Eley
Assistant Examiner—C. Richard Martin
Attorney, Agent, or Firm—Raymond L. Coppiellie; Clifford L. Sadler

[57] ABSTRACT

The invention provides an apparatus and method for mechanically applying a weather strip or other channel-shaped strip to a peripheral lip of a body or an opening, notably a vehicle door opening. The apparatus comprises a plurality of radially extensible arms extending from a centrally defined hub, each arm being operative to grip and apply the strip to the lip. The apparatus further includes a device for gripping the free ends of the sealing strip after the strip has been fed through the apparatus and for indenting the free ends radially inward while the remainder of the strip is applied to the lip. The free ends are then applied to the lip in abutting relationship. A method for applying the sealing strip is also disclosed.

3 Claims, 5 Drawing Sheets

APPARATUS AND METHOD FOR MECHANICALLY APPLYING A SEALING STRIP

This application is a division of application Ser. No. 07/705237, filed May 24, 1991, now U.S. Pat. No. 5,121,532.

BACKGROUND OF THE INVENTION

1. Field of the Invention

The present invention relates to an apparatus and method for applying a weather seal to the lip of an opening, for example a door or window frame, of a motor vehicle. 2 Disclosure Information It is customary to fit a seal to the lip of many openings to provide a resilient lip against which a door or other closure member seats to provide a water and draft proof closure to the opening. Typically, the seal takes the form of a strip of material having a U-, V- or other channel-shaped cross-section. The channel section is push fit onto the lip of the opening in the body or other structure within which the opening is formed. If desired, the opening can be provided with a peripheral flange onto which the channel fits and the channel can be provided with internal spring tooth members which provide a positive grip between the channel and the lip of the opening to secure the strip of material in position.

The strip of material can take a number of forms and can be made from a wide range of materials. For example, the channel member can take the form of a flexible strip of metal or plastic having a series of transverse arms bent over to form the U-shaped cross section strip member. The strip member is usually covered with a plastic or fabric outer cover which carries one or more solid or hollow beads to provide axially extending external resilient sealing members at the apex of the channel section and/or along one external side wall of the channel section.

For convenience, the term weather strip will be used herein to denote in general any flexible elongated sealing strip member having the above general structure and adapted for fitting upon a peripheral flange or lip of an opening in any structure, but preferably of a door open.ing in a motor vehicle. Also, the term lip will be used herein to denote the peripheral edge of the opening or the projecting flange which operatively acts as the edge of the opening. The lip or flange can surround the exterior of an article, for example a door or inspection hatch, which is fitted into an aperture, rather than around the aperture or opening into which the door or hatch is fitted.

Hitherto, such weather strips have been fitted to a door opening during the manufacture of a motor vehicle by cutting the strip to the desired length to fit around the periphery of the opening. One end of the strip is then fitted onto the lip of the opening at any suitable point and the remainder then progressively located on the lip and pushed home onto the lip until the spring grippers within the channel section engage the lip. Typically, a wooden or similar mallet is used to drive the grippers home onto the lip. However, this is a cumbersome and time consuming operation. Furthermore, problems can arise in that the opposed ends of the strip can separate as the strip is driven radially outward to seat fully home on the lip of the opening, since they are not secured to one another, and the seal therefore becomes broken at that point.

It has been proposed to mechanize the operation of fitting the weather strip to a vehicle For example, British Patent specification No. 2,152,569A proposes a system which cuts the weather strip to the length required and secures the ends of the cut strip together to form a closed loop of material. This loop is then placed on a jig having a number of radially extensible arms which support the loop in a configuration which will fit into the opening. The jig then advances to carry the loop into register with the lip of the opening and the arms extend radially to press the loop onto the lip. However, this method requires that individual, closed loops of weather strip be made and loaded for each opening and this adds to the cost and complexity of fitting the weather strip, notably on a large scale production line.

U.S. Pat. No. 4,620,354 discloses an apparatus and method for robotically applying a length of weatherstrip to a vehicle door. The '354 patent proposes the use of a single end effector disposed on an end of a robotic arm, the end effector being adapted to cut a length of weather strip from a roll to apply the strip to the opening. It is disclosed in the '354 patent that the length of the weather strip exceed the circumferential length around the inside of the opening.

U.S. Pat. Nos. 4,715,110; 4,760,636; 4,780,958; 4,843,701; and 4,852,240, all assigned to a common assignee, disclose robotic weatherstrip installation systems having a single robotic end effector disposed on the end of a multi-axes robotic arm. The end effector includes means for gripping a closed loop of weatherstriP from a hanger, transporting the loop back to the vehicle, and using an intricate series of maneuvers to roll the weatherstrip onto the door flange through the use of a powered roller. It is also known to use such an end effector to grip a free end of an open loop of weatherstrip to install the weatherstrip to the vehicle opening.

There exists a need for a simple, rapid and effective mechanical means for fitting the weather strip during the manufacture of motor vehicles The present invention provides a method and apparatus by which a weather strip can be applied mechanically to a peripheral lip surrounding a vehicle opening.

SUMMARY OF THE INVENTION

Accordingly, the present invention provides an apparatus for mechanically installing a fixed length of a sealing strip onto a peripheral lip circumferentially surrounding a body. The apparatus comprises means for feeding said sealing strip into the apparatus, the means comprising a feed tube and a plurality of guide rollers extending around an internal circumference of the apparatus and being operative to form the sealing strip into an open-ended loop generally approximating the circumferential shape of the lip surrounding the body.

The apparatus further comprises a plurality of radially extensible arms extending from a centrally defined hub. Each arm includes gripping means disposed on an end thereof for engaging the sealing strip and for pressing the sealing strip onto the lip at a plurality of predefined locations around the body. The apparatus also includes means for rolling the strip onto the lip between the plurality of predefined locations, the means including a plurality of pressure rollers. Each pressure roller is disposed on a guide track interposed between the plurality of radially extensible arms.

The apparatus of the present invention further comprises means for gripping at least one free end of the sealing strip after the strip has been fed through the apparatus, the means being operative to indent radially the end from the plane of the loop of sealing strip and to cause the end to follow an arcuate path rnto engagement with the lip after the sealing strip has been pressed onto the lip.

The present invention also provides a method for mechanically fitting a channel-shaped sealing strip to a peripheral lip circumferentially surrounding an opening of an automotive vehicle. The method comprises the steps of: providing an open-ended, fixed length of sealing strip to a means for mechanically fitting the strip to the lip; guiding the strip through the means to form an open loop of the sealing strip, the loop having a configuration generally similar to the configuration of the opening, each end of the loop being free; gripping the free ends of the loop and indenting the ends radially inward from the plane of the loop; and moving the loop of sealing strip into alignment with the lip of the vehicle opening. The method further comprises the steps of: applying a radially acting force against the strip to press the loop onto the lip at a plurality of predefined locations; applying a radially acting force against the strip between the predefined locations so that the strip engages the lip; moving the free ends of the loop radially outwardly along generally identical arcs of travel with respect to the plane of the loop so that the ends engage the lip; and applying a force to the ends in a direction normal to the lip so that the ends axially engage the lip and one another in abutting relationship In one embodiment of the method according to the present invention, the step of applying a force to the free ends of the loop in a direction normal to the loop further comprises the steps of: applying a force normal to the lip against a first free end of the loop so that a portion of the first end partially engages the lip; moving a second end of the strip along a linear and arcuate path from a radially indented position and pressing the second end onto the liP so as to form a hump with the sealing strip; and applying a force in a direction normal to the lip against the hump to force the first and second free ends into abutting engagement with one another.

DETAILED DESCRIPTION OF THE PREFERRED EMBODIMENT

Figure 1:
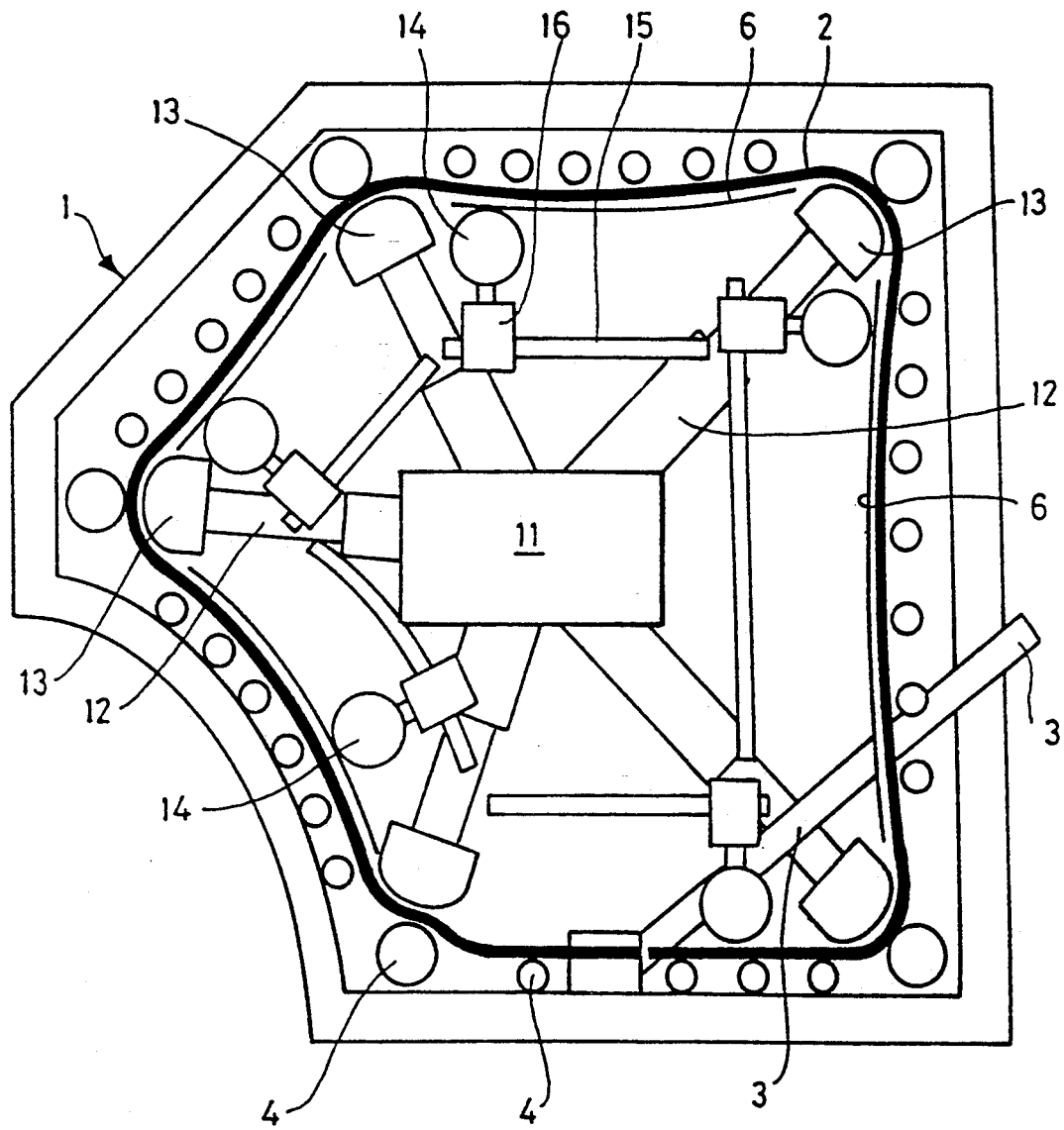
FIG. 1 is a diagrammatic view of the internal (door) face of an apparatus for applying the weather strip to a rear door opening of a vehicle.
Figure 2:
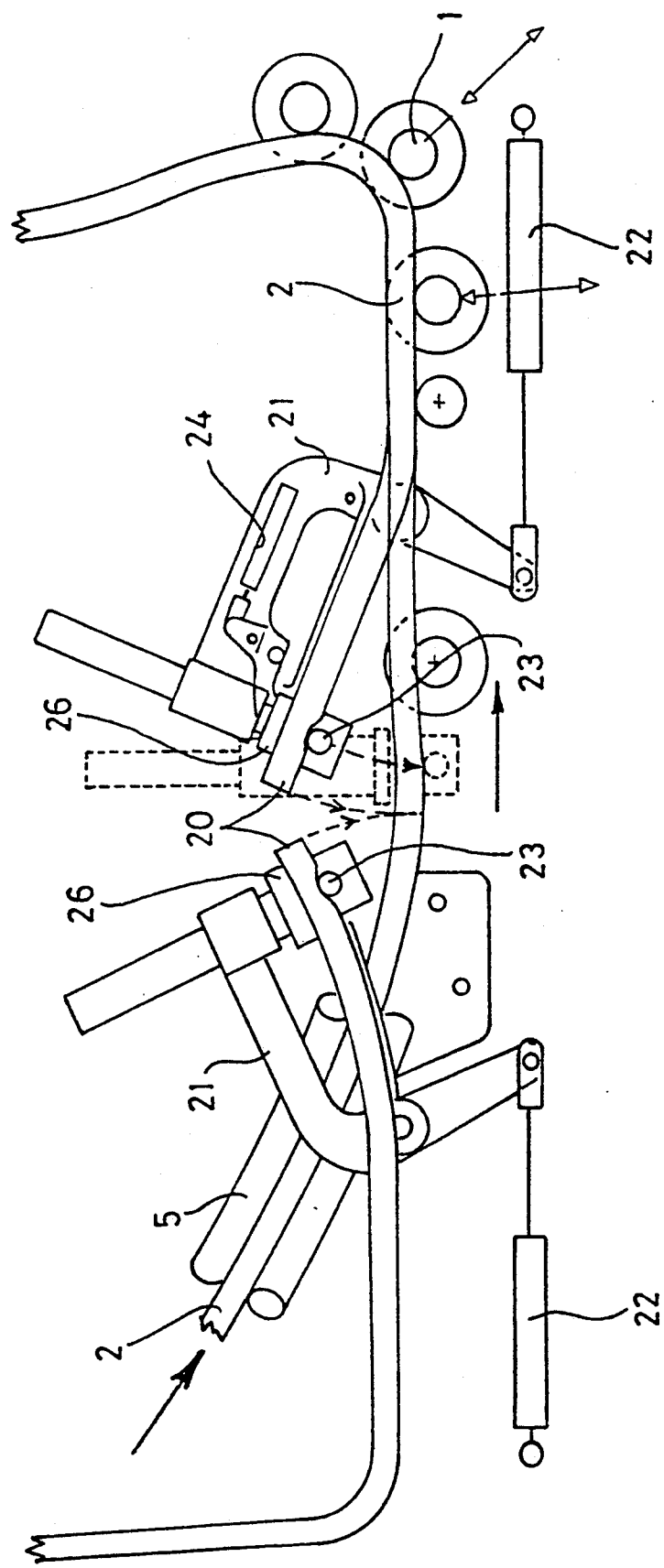
FIG. 2 is a diagrammatic side view of the mechanism for indenting the free ends of the weather strip fed to the apparatus of FIG. 1.

The apparatus of FIG. 1 comprises an outer housing 1 containing the drive mechanism for various operating parts for applying the weather strip 2 to the lip of a rear door frame of a vehicle. The housing 1 carries on its outer face a feed tube 3 for feeding the weather strip onto a first of a series of rollers 4 for deploying the strip as an open loop around the interior of the housing 1. Preferably, as shown in FIG. 2, the feed tube 3 contains transport belts 5 for mechanically conveying a free end of the strip onto the first roller 4. Alternatively, the tube 3 can have a low friction interior surface and an operator pushes the strip down tube 3 onto the roller 4. For reasons which will become apparent hereinafter, the length of the strip member 2 exceeds the total circumferential length of the lip surrounding the opening by 0.1 to 5 percent.

The upright wall of housing 1 carries the series of rollers 4 on transverse shafts, at least some of which are driven to carry the strip around the interior of the housing to adopt a configuration generally similar to the lip of the door to which it is to be fitted. Preferably, the guide rollers 4 cooperate with guide plates 6 carried by a support plate so that a length of strip member 2 fed to the initial guide roller will be deployed around the series of guide rollers 4 to form an open loop. The rollers 4 and guide plates 6 support the strip 2 radially in its deployed configuration. The feed tube 3, guide rollers 4 and guide plates 6 comprise means for feeding a fixed length of weather strip into the apparatus of the present invention.

Figure 4:
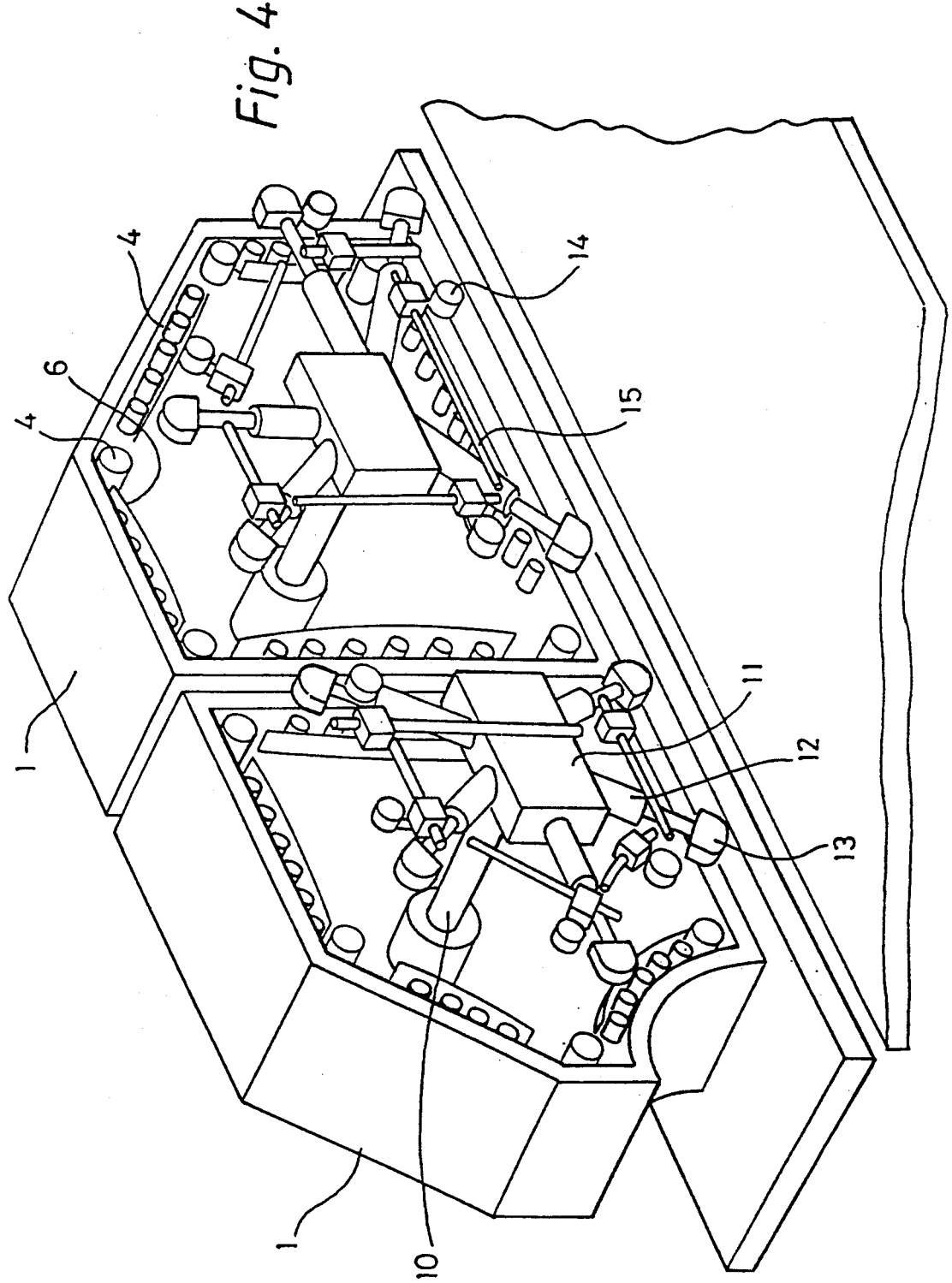
FIG. 4 shows the device of FIG. 3 in the extended position to align the weather strip with the lip of the door opening.

Located approximately centrally within the housing 1 is a transverse shaft 10 which carries a hub 11 from which radiate a plurality of radially extensible arms 12 directed towards the corners of the door opening. The arms 12 can be hydraulically, pneumatically or electrically extended so that curved end pieces, such as grippers or rollers 13 carried at or adjacent the end of arms 12, carry the strip 2 into engagement with the lip of the door opening at predefined loca.tions, such as in the corner extremities. The end pieces 13 can have circumferential grooves for receiving the strip 2 therein. The shaft 10 can be extended from the housing 1 (as shown in FIG. 4) to carry the hub 11 and the arms 12 transversely into alignment with the lip of the door opening under the control of a suitable sensor arrangement (not shown) which detects when the strip carried on end pieces 13 is aligned with the lip of the door opening. For example, reference location points on the car body or door frame can be utilized to align the strip 2 with the lip of the opening. It will be appreciated that the door opening may carry a locating flange to provide a reference point to the lip upon which the strip 2 is mounted, wherein the shaft 10 would carry the strip 2 into alignment with the flange prior to applying the strip to the lip. After being fed into the apparatus of the present invention, the strip 2 is supported in its deployed configuration upon end pieces 13 to be clear of the rollers 4 and the guide plates 6 on the rear wall of the housing when the shaft 10 is extended during the alignment of the strip 2 with the lip.

The hub 11 also carries a plurality of pressure rollers 14 on tracks or guides 15 running generally parallel to the side portions of the door opening between the corners into which the end pieces 13 extend. The rollers 14 can be plain-faced or can have circumferential grooves or the like into which the strip 2 locates. The rollers 14 also can carry lateral gripper fingers (not shown) to retain the strip 2 upon the rollers 14. The rollers 14 are provided with hydraulic, electric, pneumatic or other means 16 for radially extending the rollers 14. The extension devices 16 are journaled on guide rails or chains 15 whereby the rollers 14 are extended radially to press the strip 2 onto the lip of the door opening and to drive the rollers 14 along the guides 15.

As shown in FIG. 2, the free ends 20 of strip 2 are deflected radially inward from the line of the closed loop by means of the canting gripper roller arms 21 also carried with the hub 11. These are pivoted about fixed pivot points by means of hydraulic rams 22, or by means of a spring bias (not shown) to carry the free ends radially inwards when the free ends 20 of the strip are located at a gripper pin 23. These radially acting devices can be operated by suitable electrical, hydraulic or other known means. Thus, for example, the devices can be spring or otherwise biased to adopt the radially inward indented position and moved radially outward to engage the strip with the lip of the opening. The mechanisms can be actuated before or during radial deployment of the remainder of the strip member into engagement with the lip of the opening. Alternatively, the free ends 20 can be carried out of the plane of the remainder of the loop by guides extending forwardly and/or rearwardly of the plane of the loop. As a result, the deployed length of strip adopts a longer path than that required to complete the looP and the excess length of the strip is thus accommodated.

The presence of either or both of the free ends 20 in the desired position is detected by photocells or other proximity sensors. For example, photocells, infra red sensors, pressure switches, contact switches or the like, detect when the free ends 20 reach the positions in the series of guide rollers 14 at which they are to be indented. The sensors halt the strip at the desired position and actuate the radially acting mechanisms which carry one or both free ends of the strip radially inward out of the line of the closed loop at that point and/or which return the free ends to the line of a closed loop to engage them with the lip of the opening as will be described below. If desired, the free ends of the strip can be supported against lateral movement with respect to the lip of the opening by forming the indented guide rail or radially acting mechanism with lateral supports or gripPers, for example by providing the guide rail or mechanism with a U-section within which the strip member is carried or by providing lateral support fingers or the like.

Figure 3:
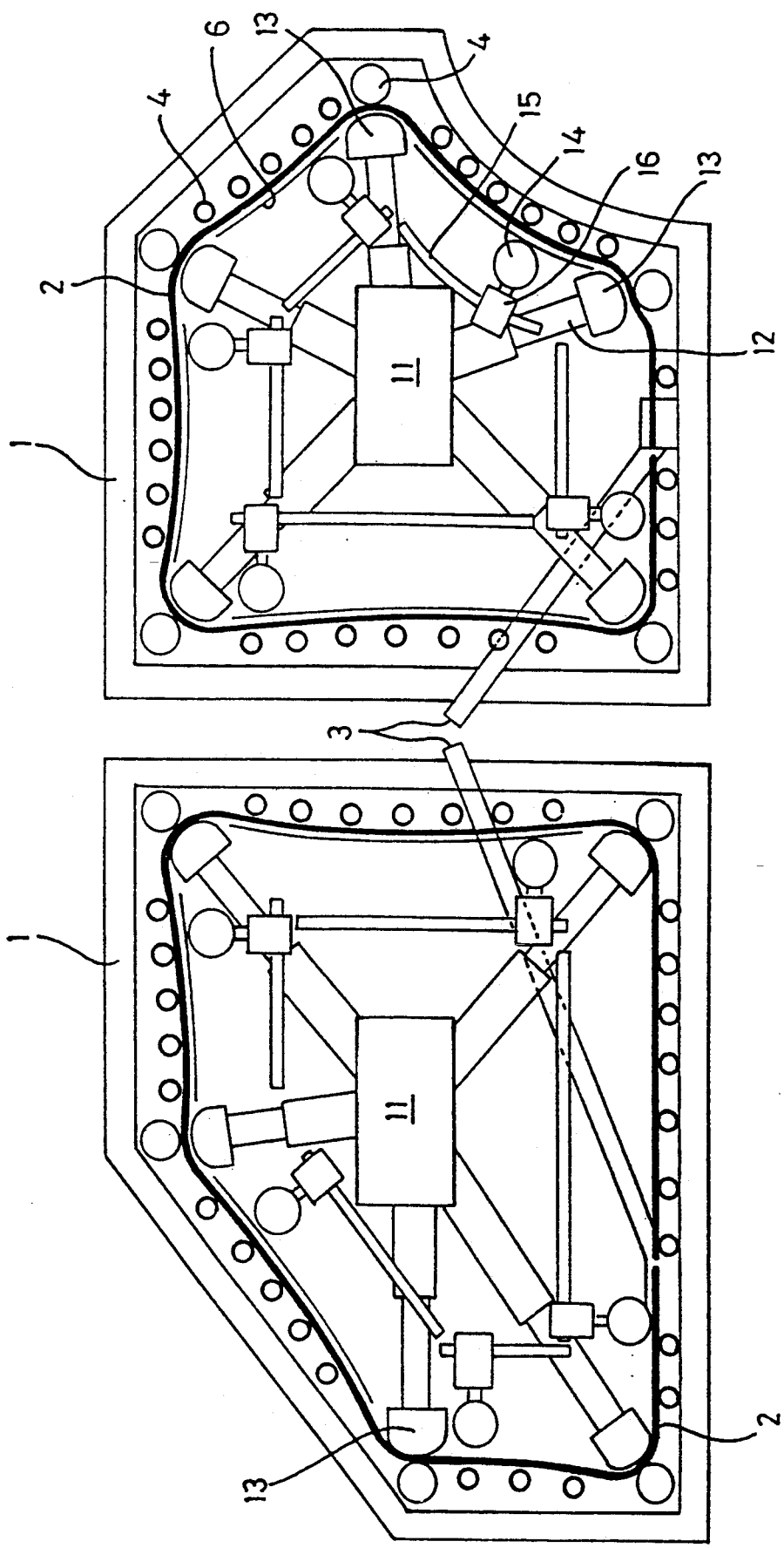
FIG. 3 is a diagrammatic perspective view of the apparatus of FIG. 1 in combination with a similar device for applying the weather strip to a front door of a vehicle.

The photocells or other proximity sensors generate a signal which actuates rams 24 to grip the free ends 20 between pins 23 against a stop plate 26 as well as rams 22 to pivot the arms 21 upwards. Preferably, the free ends 20 follow opposed but substantially identical arcs of travel as arms 21 pivot to the raised position as shown in FIG. 3. Due to the curvature in strip 2 at this point, the free ends 20 are opposed to one another, but are spaced from one another so that the excess length in strip 2 over the peripheral length of the lip of the door opening can be accommodated.

In operation, a length of strip 2 approximately 1 to 2% greater than that required to cover the lip of the door opening is fed manually into the feed tube 3 to engage the drive belts 5 and thus be fed onto rollers 4 around the interior of the housing. The deployed strip is also supported on end pieces 13. When the rear free end of strip 2 passes the sensor, it trips the operation of rams 24 which grip the ends of the strip between pins 23 and plates 26 to prevent further travel of the strip. Rams 22 are then actuated to tilt the arms 21 to carry the free ends 20 into the indented position shown in FIG. 3. By virtue of the semi-rigid nature of the weather strip 2, it retains the shape into which it is formed as it passes around the series of rollers 4 and the guide plates 6.

Shaft 10 is then extended to carry the strip 2 on end pieces 13 clear of rollers 4 and guide plates 6 and into register with the lip of the door opening. Arms 12 extend to carry the strip 2 into engagement with the corners of the lip of the door opening. The extension devices 16 extend rollers 14 radially and progressively apply radial pressure to the strip 2 between the corner points to engage and press the strip 2 onto the lip of the door opening. Rams 24 operate to release the free ends 20 and to carry the pins 23 out of the path of travel of the free ends 20 towards the lip of the opening. Rams 22 operate either after the strip has been pushed home onto the lip of the opening elsewhere by the operation of rollers 14, or preferably as the rollers 14 operate, to carry the free ends 20 in a radially outward arc to engage the lip along the line of the closed loop. Plates 26 press the free ends 20 onto the lip of the opening with the end faces of the free ends 20 engaged in a butt join under axial compression which is retained as the ends are pushed fully home on the lip of the opening. The use of an abutting interface between the free ends of the strip 2 provides opposed bearing faces which substantially prevent any over-riding of the free ends and thus maintains the axial compression generated without the need to secure the ends of the strip material together as hitherto. However, if desired, the free ends can be secured to one another and/or to the lip of the opening by adhesive, welding, crimping or other means, before, during or after the loop of strip member is radially deployed. Where this is done, the interface between the free ends need not be a butt interface, but could be for example a scarfed interface.

The arms 12, the extension devices 16 and shaft 10 then retract to carry the apparatus of the present invention back into housing to receive another length of strip 2 for application to the door opening of another car body.

The compression generated by bringing the free ends into register will depend upon the excess of the length of the strip member over the length of the lip of the opening. Some of this excess may be taken up as the strip member is located fully home on the lip of the opening and allowance for this should be made for when calculating the overall excess required to maintain axial pressure in the finally deployed strip member. Typically, the length of the strip member used in the method of the invention will be from 0.1 to 5% greater than the length of the lip.

Figure 5:
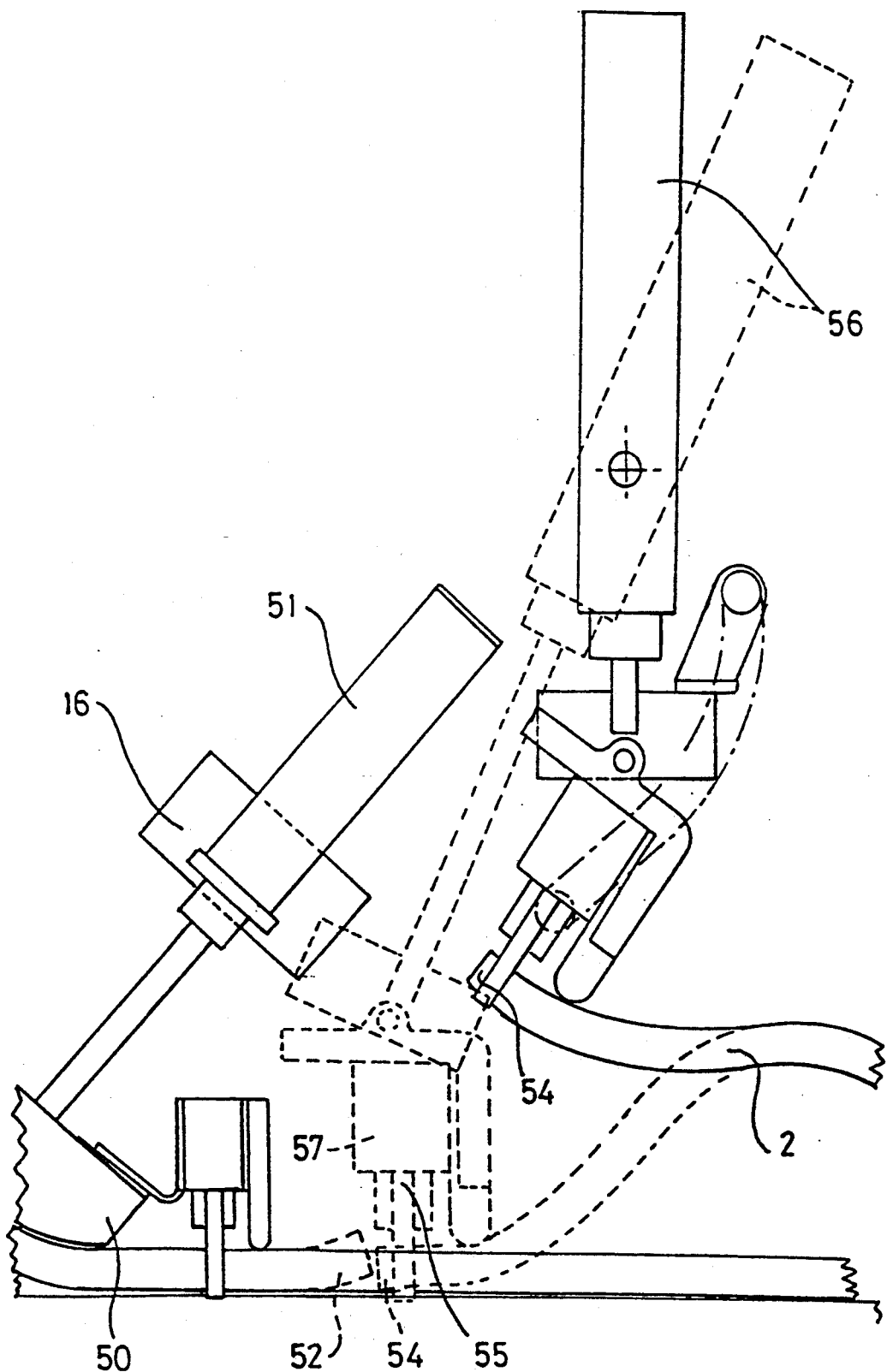
FIG. 5 is a diagrammatic side view of an alternative to the mechanism shown in FIG. 2 for applying the free ends of the strip member to the lip of the opening.

In the modification shown in FIG. 5, the left hand free end of the strip 2 is applied to the lip by one of the rollers or curved ends 50 carried at or adjacent the rod of an hydraulic or pneumatic ram 51 carried by an extension device 16 of the apparatus of FIG. 1 to leave a slight upturned end 52 of the strip not pushed fully home on the lip. This is conveniently achieved by mounting a sensor, e.g. a photocell 53, a fixed distance ahead of the leading edge of the roller or curved end 50 which detects the free end of the strip and halts further movement of the roller or curved end 50 before the free end is reached.

The other free end 54 of strip 2 is held in a clamping means 55 similar to the gripper roller and plate used in the mechanism of FIG. 2. However, in this case the ram 56 operating the strip end clamping block 57 is pivoted so that the free end 54 is carried in a combined linear and arcuate path from its radially indented position to the position at which it engages the lip of the opening (as shown dotted). In this way, the free end 54 is pressed onto the lip of the opening a clearance distance free from the opposed end face of the upturned end 52. This causes the strip 2 to the right of the clamping block 57 to form a hump as shown to accommodate the excess length of the strip. This hump is then pressed home onto the lip of the opening by the curved end or roller 50 serving it. As the hump is pressed flat an axial compression is generated in the end portion of the strip which causes the free end to abut closely against the end 52 as that latter is pushed home upon the lip of the opening.

The invention has been described above in terms of applying a weather strip to a door opening of a vehicle on a vehicle assembly line. If desired, two devices operating according to the present invention can be operated in parallel to apply weather strip to the front and back door openings of a car simultaneously. Also, the present invention can apply a channel section member to other structures, for example to water or other tanks or vessels. Alternatively, the present invention can be used to apply a channel member to the outer lip or rim of a body, as opposed to applying the channel member to a lip within the body as described above. Thus, the invention can apply a sealing lip to a lid, inspection hatch, cover or the like which is fitted into an aperture in a structure. It is the following claims, including all equivalents, which define the scope of my invention.

I claim:

1. A method for mechanically fitting a channel-shaped sealing strip to a peripheral lip circumferentially surrounding an opening of an automotive vehicle, comprising the steps of:

provising an open-ended, fixed length of sealing strip to a means for mechanically fitting said strip to said lip;

guiding said strip through said means to form an open loop of said sealing strip, said loop having a configuration generally similar to the configuration of said opening, each end of said loop being free;

gripping said free ends of said loop and indenting said ends radially inwardly from the plane of said loop;

moving said loop of sealing strip into alignment with said lip of said vehicle opening;

applying a radially acting force against said strip to press said loop onto said lip at a plurality of predefined locations;

applying a radially acting force against said strip between said predefined locations so that said strip engages said lip;

moving said free ends of said loop radially outwardly along generally identical arcs of travel with respect to the plane of said loop so that said ends engage said lip; and applying a force to said ends in a direction normal to said lip so that said ends axially engage said lip and one another in abutting relationship 2. A method according to claim 1, wherein the step of providing a length of sealing strip further comprises providing sealing strip having a total length of one to two percent greater than the circumference of said lip surrounding said opening.

3. A method according to claim 1, wherein the steps of moving said free ends of said loop radially outwardly and of applying a force to said free ends of said loop in a direction normal to said lip further comprises the steps of moving a first free end of said strip along a linear and arcuate path from a radially indented position;

applying a force normal to said lip against the first free end of said loop so that a portion of said first end partially engages said lip;

moving a second end of said strip along a and arcuate path from a radially indented position and pressing said second end onto said lip so as to form a hump with said sealing strip; and applying a force in a direction normal to said lip against said hump to force said first and second free ends into abutting engagement with one another.

* * * * *